United States Patent [19]

Adler

[11] Patent Number: 4,617,911

[45] Date of Patent: Oct. 21, 1986

[54] SOLAR HEATER

[76] Inventor: Rafael Adler, Derech Petah Tikva St., 7 Tel-Aviv, Israel

[21] Appl. No.: 607,269

[22] Filed: May 4, 1984

Related U.S. Application Data

[63] Continuation-in-part of Ser. No. 243,202, Mar. 12, 1981, abandoned.

[30] Foreign Application Priority Data

Mar. 20, 1980 [IL] Israel ......................................... 59675

[51] Int. Cl.⁴ ................................................ F24J 2/10
[52] U.S. Cl. ..................................... 126/438; 126/444; 126/445; 126/450
[58] Field of Search ................. 126/450, 438, 444, 445

[56] References Cited

U.S. PATENT DOCUMENTS

| | | | |
|---|---|---|---|
| 1,003,514 | 9/1911 | Roundtree | 126/438 |
| 3,923,039 | 12/1975 | Falbel | 126/438 |
| 3,981,294 | 9/1976 | Deminet et al. | 126/449 |
| 4,038,964 | 8/1977 | Drew | 126/438 |
| 4,062,352 | 12/1977 | Lesk | 126/444 |
| 4,210,128 | 7/1980 | Mattson | 126/444 |
| 4,263,896 | 4/1981 | Zabuhr | 126/450 |

FOREIGN PATENT DOCUMENTS 2648060  5/1978  Fed. Rep. of Germany ...... 126/450

Primary Examiner—Larry Jones
Attorney, Agent, or Firm—Birch, Stewart, Kolasch & Birch

[57] ABSTRACT

The present invention relates to a solar heater for heating a fluid which is constituted by a frame, a bottom plate, partitions, an upper plate of a transparent material, an inlet and an outlet for the fluid. The bottom plate is preferably made of a blackened material, e.g. metal, plastic, whereas the upper plate is preferably made of glass, perspex or P.V.C. A modification comprises a concave mirror coated with a reflecting material and covered with a transparent plate into which a unit of the above solar heater is inserted. The invention relates also to a system comprising several units of solar heaters.

21 Claims, 10 Drawing Figures

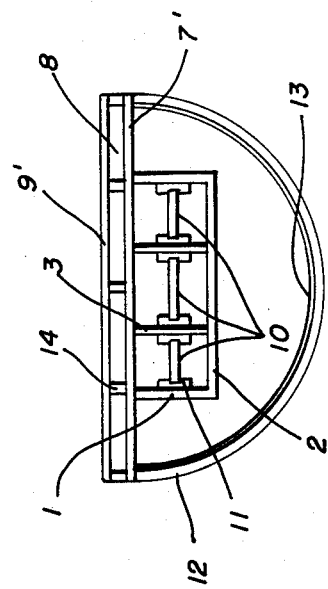
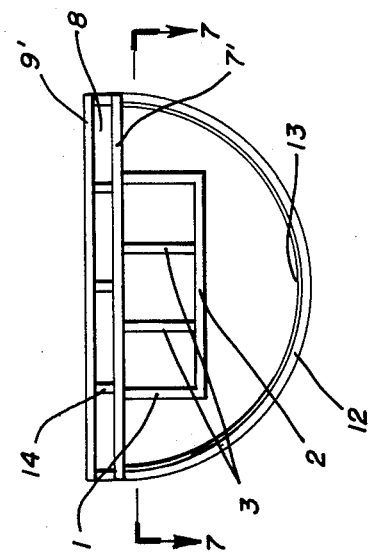
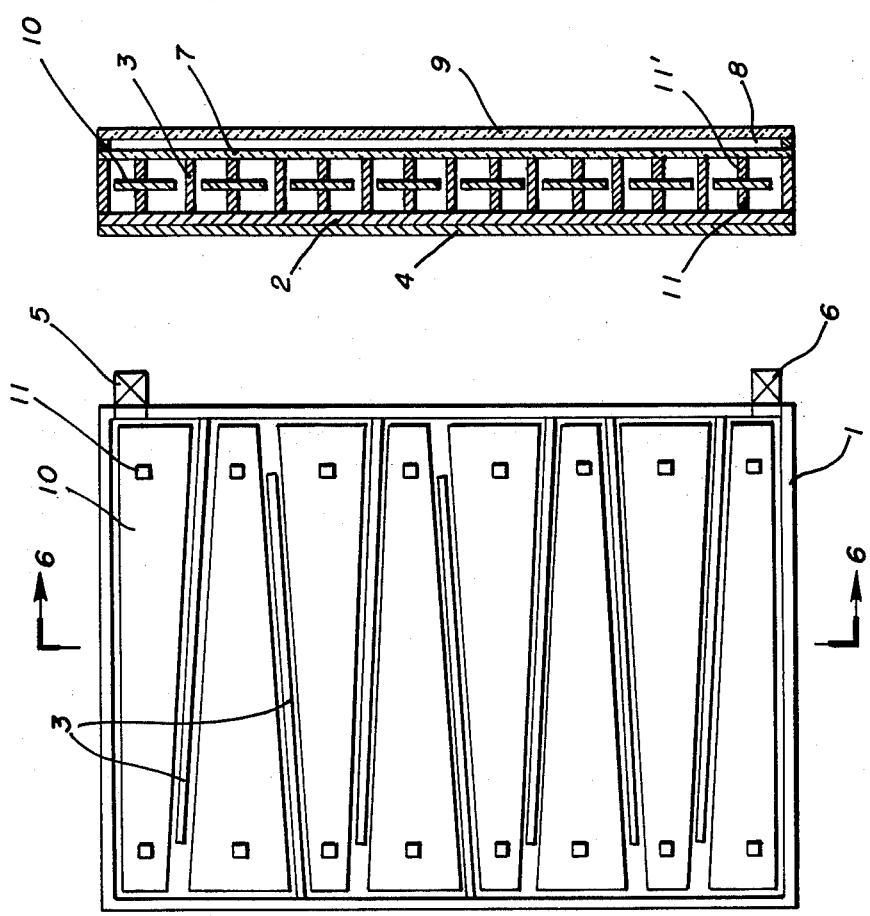
FIG. 7
FIG. 7a
FIG. 6
FIG. 5

SOLAR HEATER

This application is a continuation in part application of Ser. No. 243,202 filed Mar. 12, 1981, now abandoned.

BACKGROUND AND SUMMARY OF THE INVENTION

The present invention relates to a solar heater.

At present a commercially available solar heater substantially comprises a frame in which there are arranged pipes through which the fluid, e.g. water, to be heated flows. Said pipes are usually made of a blackened material and the bottom of said frame also is made of a dark material whereas the upper plate has to be made of a transparent material. This system has a drawback in that the yield of the sun's rays is rather low.

It has therefore been desirable to provide a system by which the yield of the sun's rays is increased. However, such a system should also be substantially easy to manufacture and erect and should not be too expensive.

The present invnetion thus consists in a solar heater for heating a fluid which is constituted by a frame, a bottom plate, partitions, an upper plate made of a transparent material and an inlet and outlet for the fluid.

The invention will be illustrated with reference to the use of water, as this will most probably be the fluid used in Israel. However, in cold climates at first a low freezing fluid will be used which will then serve as a heat-exchange unit.

The bottom plate is preferably made of a blackened material, e.g. metal, plastic, etc. However, this is not always necessary as will be shown hereinafter.

The partitions are preferably connected to both plates and eventually also to one or more of the walls of the frame. Said partitions may have any desired suitable shape, i.e. they may be straight, oblique, curved, etc. Said partitions enable the fluid flowing through the device to remain for a long time within it and to absorb a large amount of heat. Moreover, they also may serve as connecting means of both plates.

Said partitions may extend in either horizontal or vertical direction.

The upper plate is made of any commercially available transparent material, e.g. glass, perspex, a suitable plastic material, e.g. P.V.C., etc.

It is easily understood that the area of water heated in accordance with the present invention is greatly increased by the method of the present invention.

Naturally there may be arranged more than one transparent plate the distance between the various transparent plates serving as insulation.

If desired the bottom or the upper plate may be made together with the partitions ans one piece which saves material and costs. In certain circumstances it may be possible to manufacture said device as one unit, i.e. the frame, the plates and the partitions by way of extrusion.

Sometimes it is desirable to add blackened metal plates between the partitions which plates are suitably arranged. In this case the lower plate must not be made of metal. It may for example be made of the same material of which the upper plate is made or from any other suitable material.

It is readily understood that it is advantageous to put around the entire device a good insulating material, e.g. a glass wool, foamed polystyrene, foamed polyurethane, etc.

The frame preferably comprises means which may be connected to each other so that several solar heaters according to the present invention may be connected to each other and thus form a part of a roof, a wall, etc.

The blacking is performed by methods known per se. One may use a dark fluid either as an addition to the blacking agent or instead of it.

In another aspect of this invention one may use a big concave mirror coated with a reflecting material and covered with a transparent plate into which a narrow unit of the solar heater according to the present invention is inserted in order to improve the efficiency of the sun's rays.

A narrow unit in connection with the present invention comprises preferably the bottom plate, advantageously made of a transparent material, the frame walls, partitions and optionally a metal plate inside the unit. The transparent plate covering the mirror, serves as the upper plate of the unit. However this modification of the invention is not restricted to this possibility and any other narrow unit described above and within the scope of the present invention may be utilised.

A preferred embodiment of said modification consists in a solar heater for directly heating a fluid supplied thereto comprising:

a concave member having a predetermined length with a reflective material disposed on an inner surface thereof;

a transparent plate having a predetermined width, an upper surface and a lower surface, said transparent plate being positioned on said concave member to form a closed container between the inner surface of said concave member and the lower surface of said transparent plate;

a bottom plate;

frame walls being operatively connected to said bottom plate and to said transparent plate for forming a fluid tight thin space;

partition plates extending between both said plates;

an inlet being operatively connected to said fluid tight thin space for supplying a fluid thereto;

an outlet being operatively connected to said fluid tight thin space for discharging a fluid therefrom;

said fluid tight thin space being operatively positioned within said closed container formed by said inner surface of said concave member and said lower surface of said transparent plate for direcly heating a fluid circulated through said inlet and discharged from said outlet by utilization of the rays of the sun.

In some embodiment said fluid tight thin space is in a position centrally disposed along the width of said transparent plate and centrally disposed with respect to said concave member.

Naturally also in this case there may be more than one transparent plate above the mirror.

The entire solar heater or parts thereof may be manufactured by way of extrusion.

All embodiments of the solar heater according to the present invention may be utilized as one unit or be erected in series. In the latter case the several units may be manufactured together with the support and thus form a part of a roof, of a wall or the like.

BRIEF DESCRIPTION OF THE DRAWINGS

The present invention will now be illustrated with reference to the accompanying drawings without being limited by them. In said drawings:

FIG. 5 shows a further embodiment of the solar heater according to the present invention;

FIG. 6 shows a section along line VI—VI of FIG. 5;

FIG. 7 shows a solar heater comprising a mirror and a narrow unit of the solar heater according to the present invention;

FIG. 7a shows another embodiment of a solar heater according to FIG. 7;

FIG. 7b shows a section along line VII—VII of FIG. 7a; and

DETAILED DESCRIPTION OF THE INVENTION

In the following description similar parts will bear identical numbers.

Figures 1, 2:
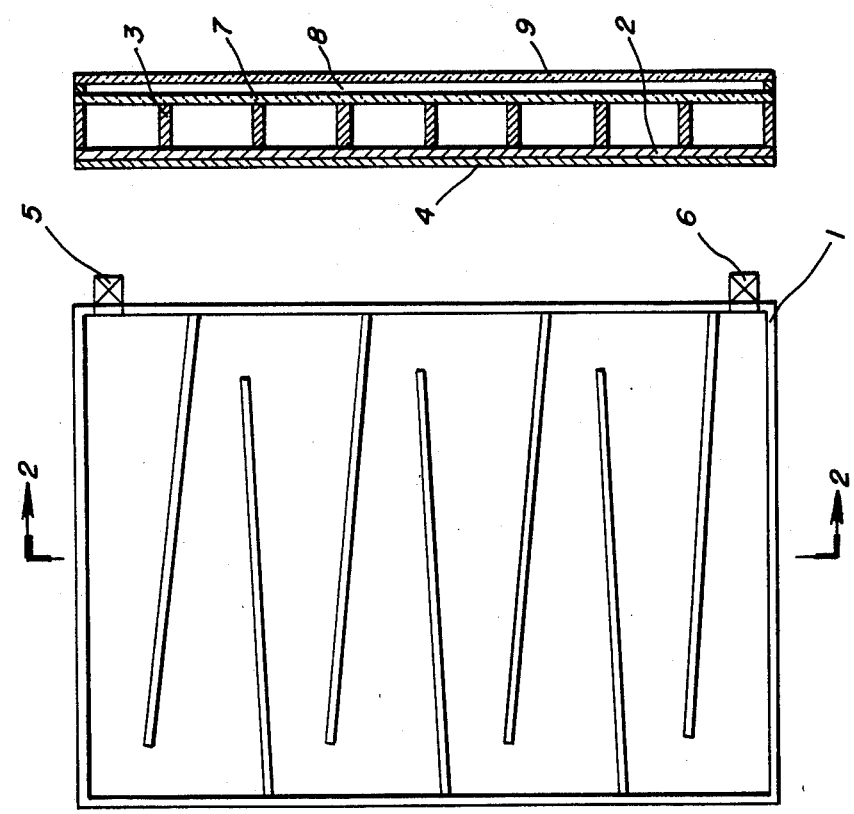
FIG. 1 shows a solar heater according to the present invention.
FIG. 2 shows a cross-section along line II—II of the solar heater illustrated in FIG. 1.

The embodiment illustrated in FIGS. 1 and 2 comprises frame 1, lower plate 2 part of which is partitions 3. Below plate 2 is arranged insulating sheet 4. Moreover, it comprises inlet 6 for the cold water and outlet 5 for the hot water. There exist a transparent plate 7, insulating distance 8 and a further transparent plate 9.

Figures 3, 4:
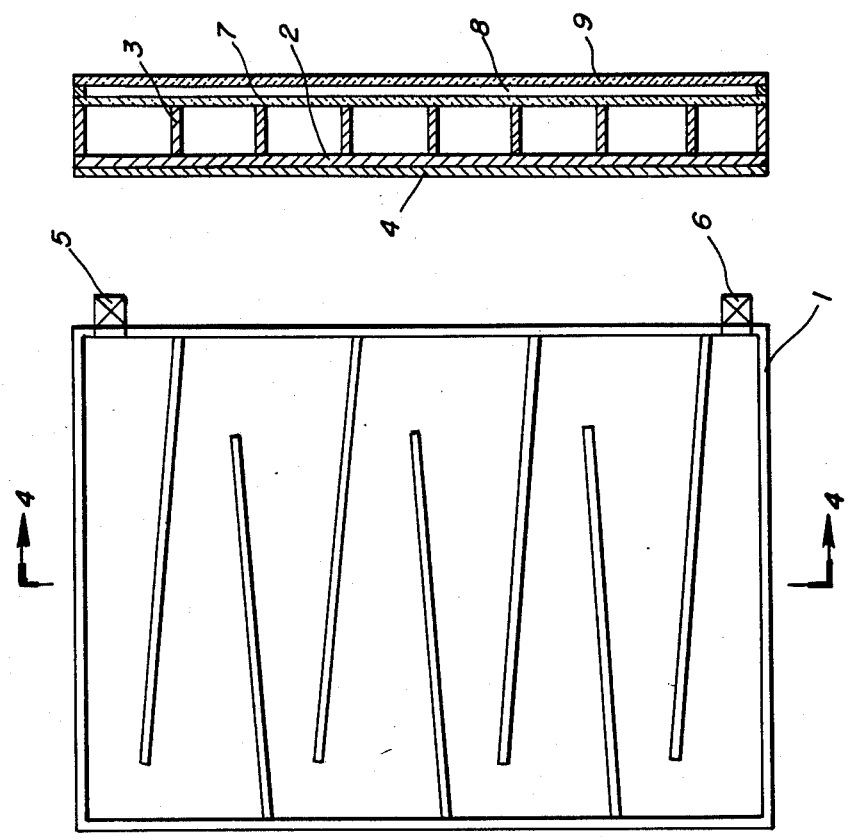
FIG. 3 shows another embodiment of the solar heater according to the present invention.
FIG. 4 shows a cross-section along lines IV—IV of the embodiment illustrated in FIG. 3.

In the embodiment illustrated in FIGS. 3 and 4 partitions 3 are no longer part of bottom plate 2.

In the embodiment shown in FIGS. 5 and 6 there are separate partions 3 as well as separate metal plates 10 which are connected to the device by spaces 11 and 11'.

Figure 7B:
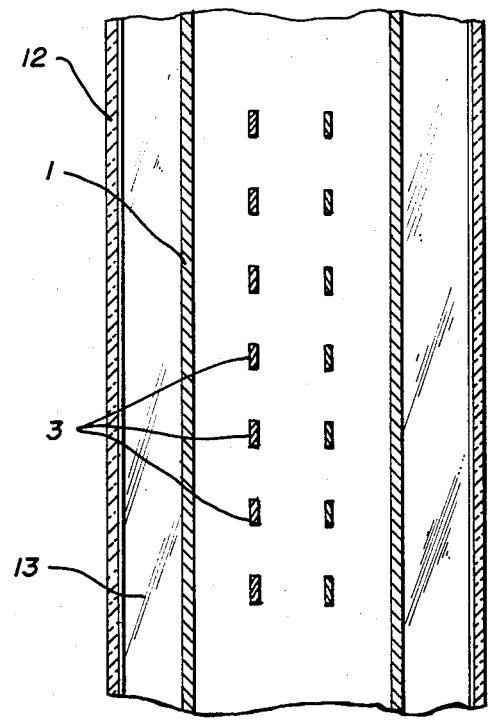

The solar heaters illustrated in FIGS. 7, 7a and 7b comprise mirror 12 coated by a reflecting material 13 and covered by a transparent plate 7'. Within the container formed is arranged a unit of a solar heater comprising bottom plate 2, partitions 3, frame walls 1 and in the embodiment illustrated in FIG. 7 metal plate 10. Upon plate 7' is arranged plate 9'. Plates 7' and 9' are connected by supports 14. (In a similar manner plates 7 and 9 are connected to each other in the embodiment illustrated in FIGS. 1 to 6).

Figure 8:
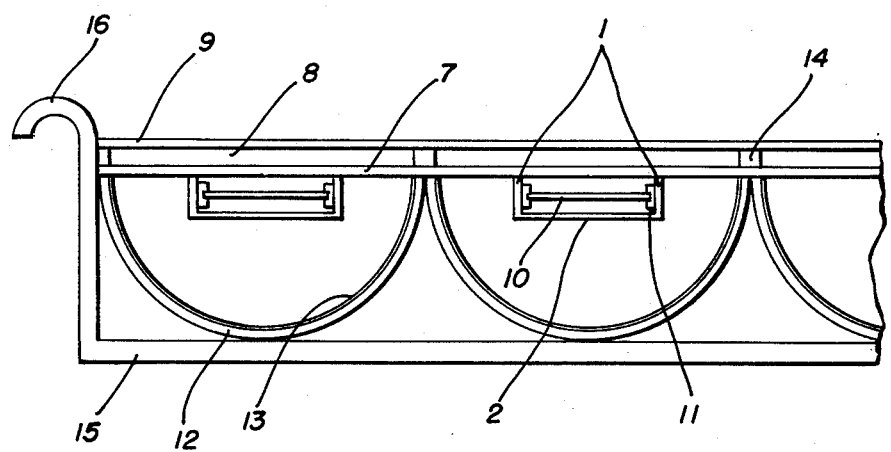
FIG. 8 shows a unit comprising solar heater according to FIG. 7 (not showing the partition plates) connected to each other and constituting a unit together with a basic plate.

The unit illustrated in FIG. 8 comprises several units as illustrated in FIG. 7 (partions 3 are not shown), basic plate 15 and means 16 (such means may also be connected to the solar heaters illustrated in Figs.1 to 6, 7a and 7b). Said unit may be manufactured in one extrusion process and constitute a part of a roof, of a wall or the like.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

I claim:

1. A solar heater for directly heating a fluid supply thereto comprising:
   a first transparent plate and a bottom plate being spaced apart at a predetermined distance and operatively connected by a plurality of partitions extending therebetween, side frame walls operatively connected to said first transparent plate and bottom plate, thereby forming a fluid flow space bounded by said side frame walls, said bottom plate and said first transparent plate, said partition plates for connecting said plates and providing a fluid flow path within said fluid flow space,
   a fluid inlet operatively connected to said fluid flow space;
   a fluid outlet operatively connected to said fluid flow space;
   blackened plate means extending between said partitions or between said partitions and said side frame walls;
   a concave member having a reflective material disposed on an inner surface thereof, said first transparent plate being positioned on said concave member to form a closed container between said inner surface of said concave member and the lower surface of said transparent plate; and
   said first transparent plate, bottom plate, side frame walls and partitions being comprised of transparent material for permitting fluid in said fluid flow space to be directly heated by rays of the sun passing through said plates, side frame walls and partitions.

2. A solar heater according to claim 1, wherein the blackened plate means extending between said partitions or between said partitions and said side frame walls is the bottom plate.

3. A solar heater according to claim 2, wherein at least a part of said solar heater is formed by extrusion.

4. A solar heater according to claim 1, wherein said bottom plate is comprised of a blackened material.

5. A solar heater according to claim 1, and further including at least one second transparent palte coplaner with said first transparent plate, said transparent plates being spaced at a predetermined distance for forming an insulating layer.

6. A solar heater according to claim 5, wherein at least a part of said solar heater is formed by extrusion.

7. A solar heater according to claim 1, wherein at least a part of said solar heater is formed by extrusion.

8. A solar heater according to claim 1, wherein said solar heater covers at least a part of a building.

9. A solar heating system for directly heating a fluid supplied thereto comprising:
   a first frame means including a base plate and side walls extending from said base plate and being capable of covering or forming a part of a structure of a building; and
   at least one solar heater positioned within said first frame means, said solar heater comprising:
   a concave member having a reflective material disposed on an inner surface thereof;
   a first transparent plate having a width, an upper surface and a lower surface, said transparent plate being positioned on said concave member to form a closed container between an inner surface of said concave member and the lower surface of said transparent plate;
   a bottom plate being positioned between said transparent plate and said inner surface of said concave member and operatively connected to said transparent plate;
   side frame walls operatively connected to said bottom plate and said transparent plate for forming a fluid flow space bounded by said side frame walls, said bottom plate and said transparent plate;

partition plate means extending between said bottom plate and said transparent plate for connecting said plates and for providing a fluid flow path within said fluid flow space;

a fluid inlet operatively connected to said fluid flow space;

a fluid oulet operatively connected to said fluid flow space; and said transparent plate, bottom plate, side frame walls and partitions being operatively positioned within said concave member for permitting fluid in said fluid flow space to be directly heated by rays of the sun passing through said transparent plate.

10. A solar heating system according to claim 9, wherein said fluid flow space is in a position centrally disposed along the width of said transparent plate and centrally disposed with respect to said concave member.

11. A solar heating system according to claim 9, wherein said bottom plate is comprised of a blackened material.

12. A solar heating system according to claim 9, and further including at least one second transparent plate coplaner with said first transparent plate, said transparent plates being spaced at a predetermined distance for forming an insulating layer.

13. A solar heating system according to claim 12, wherein at least a part of said solar heater and said first frame means is formed by extrusion.

14. A solar heating system according to claim 9, wherein said concave member is a concave mirror.

15. A solar heating system according to claim 9, wherein a plurality of said solar heaters are positioned within said first frame means in a side-by-side arrangement.

16. A solar heating system according to claim 9, wherein a plurality of said first frame means are connected together, each of said first frame means including at least one of said solar heaters.

17. A solar heating system according to claim 9, and further including blackened plate means extending between said partitions or between said partitions and said side frame walls.

18. A solar heating system according to claim 17, wherein at least a part of said solar heater and said first frame means is formed by extrusion.

19. A solar heating system according to claim 9, wherein at least a part of said solar heater and said first frame means is formed by extrusion.

20. A solar heating system according to claim 9, further including at least one second transparent plate coplaner with said first transparent plate, said transparent plates being spaced at a predetermined distance for forming an insulating layer, and including blackened plate means extending between said partitions and said sidd distance for forming an insulating layer, and including blackened plate means extending between said partitions and said side frame walls, and wherein at least a part of said solar heater and said first frame means is formed by extrusion.

21. A solar heating system for directly heating a fluid supply thereto comprising:

a first frame means including a base plate and side walls extending from said base plate and forming a part of the structure of a building; and at least one solar heater positioned within said first frame means, said solar heater comprising:

a concave member having a reflective material disposed on an inner surface thereof;

a first transparent plate having a width, an upper surface and a lower surface, said transparent plate being positioned on said concave member to form a closed container between an inner surface of said concave member and the lower surface of said transparent plate;

a bottom plate being positioned between said transparent plate and said inner surface of said concave member and operatively connected to said transparent plate;

side frame walls operatively connected to said bottom plate and said transparent plate for forming a fluid flow space bounded by said side frame walls, said bottom plate and said transparent plate;

partition plate means extending between said bottom plate and said transparent plate for connecting said plates and for providing a fluid flow path within said fluid flow space;

a fluid inlet operatively connected to said fluid flow space;

a fluid outlet operatively connected to said fluid flow space;

blackened plate means extending between said partitions or between said partitions and said side frame walls; and said transparent plate, bottom plate, side frame walls and partitions being operatively positioned within said concave member for permitting fluid in said fluid flow space to be directly heated by rays of the sun passing through said transparent plate.

* * * * *